June 11, 1929.  T. MIDGLEY  1,716,596
BAND STITCHING AND STRETCHING DEVICE
Filed Nov. 15, 1926    2 Sheets-Sheet 2

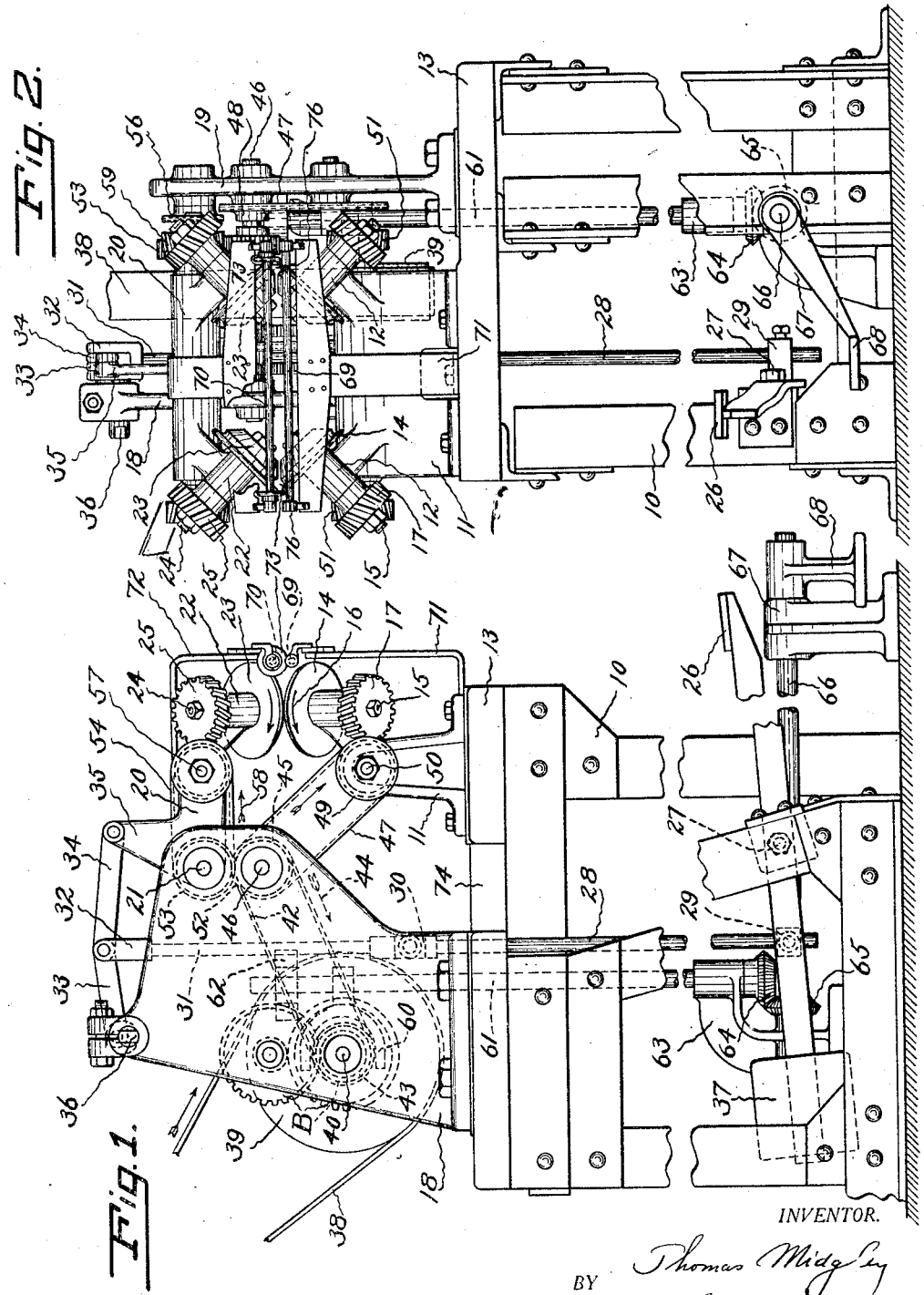

INVENTOR.
Thomas Midgley
BY
Edward C. Taylor
ATTORNEY.

Patented June 11, 1929.

UNITED STATES PATENT OFFICE.

1,716,596

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BAND STITCHING AND STRETCHING DEVICE.

Application filed November 15, 1926. Serial No. 148,410.

This invention relates to a method and apparatus for stitching and stretching flat bands with beaded edges, such as are used in the manufacture of tire casings. This apparatus is adaptable to be used with either completed tire casings or with partially completed casings having beaded edges. My invention has for its object to stretch the band between the beads to a desired and predetermined width. Another object is to stitch the material firmly about the tire beads. Another object is to iron out any wrinkles that may have been formed by the material about the beads. A further object is to complete the inversion of a partially inverted tire band.

Referring to the drawings,

Fig. 1 is a side elevation of a machine constructed in accordance with my invention;

Fig. 2 is a front elevation of Fig. 1;

Figure 3:
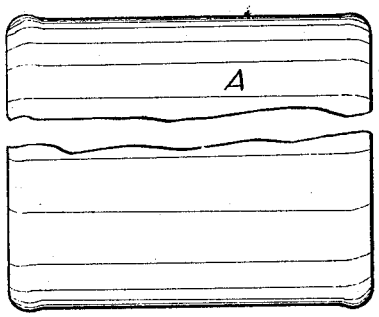
Fig. 3 is a front elevation of a tire band before being inverted.

The apparatus in its preferred form is mounted on a base 10. A bracket 11 having bosses 12 is bolted to the bed-plate 13 of base 10. The stitching device consists of a pair of beveled turning rolls 14 on shafts 15 revolving through the bosses 12 and rotated in direction of arrow 16 (Fig. 1) by means of spiral gears 17. Two standards 18 and 19 are also bolted to the bed-plate 13 and a bracket 20, pivotally mounted on a shaft 21 between the said standards, has bosses 22 corresponding to the bosses 12 of bracket 11. Another pair of rolls 23, similar to rolls 14, on shafts 24 revolving through the bosses 22 in the direction shown are actuated by means of spiral gears 25. A treadle 26 is pivoted at 27 and has a bar 28 fastened to it at 29, said bar, extending through the bed 13. A universal joint 30 at the upper end of bar 28 joins it to a bar 31. A yoke 32 on bar 31 actuates two links 33 and 34 of a toggle adaptable to lift the bracket 20 so that a tire band A may be inserted between the rolls 14 and 23. An arm 35 on bracket 20 is pivoted to the link 34 and link 33 is pivoted to an eccentric 36 fixed in the standard 18. By means of the eccentric 36 varied pressures may be applied between the rolls 14 and 23. A weight 37 on the further end of the treadle 26 maintains the toggle, and consequently the bracket 20, in the closed position shown.

Figure 5:
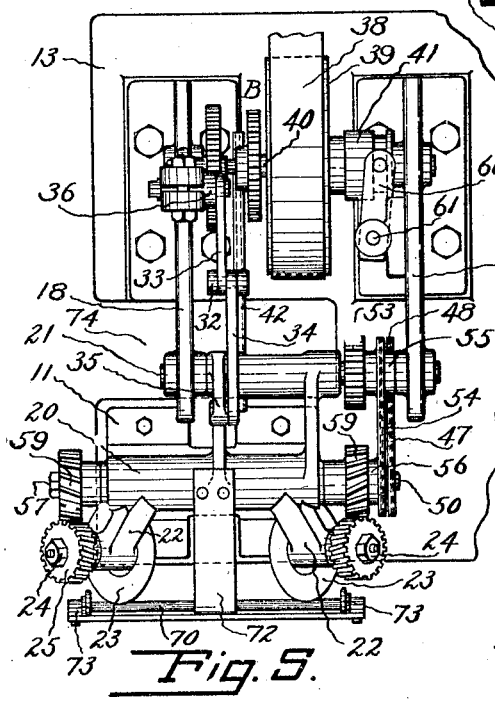
Fig. 5 is a plan view of the machine partially broken away.
Figure 7:
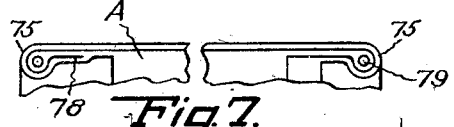
Fig. 7 is a diagrammatic section through the upper edge portion of Fig. 3.
Figure 8:
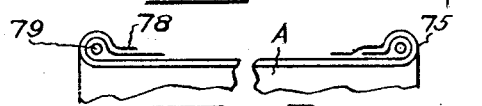
Fig. 8 is a diagrammatic section through an inverted tire band before being fed through the stitching rolls.
Figure 9:
Fig. 9 is a diagrammatic section through an inverted band after passing between the stitching rolls.
Figure 6:
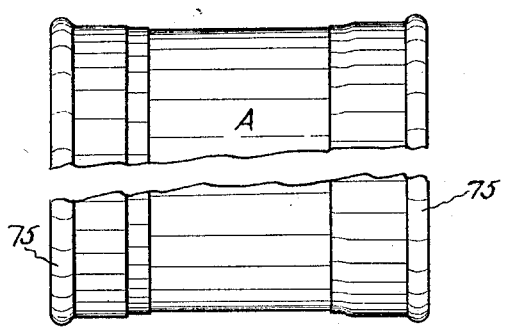
Fig. 6 is a view similar to Fig. 3 showing an inverted band.

Power for running the apparatus is furnished by a belt 38, driven by a motor or any other available means, driving a pulley 39 on a shaft 40. Gearing B, driven through a clutch 41 (Fig. 5) from pulley 39, drives a chain 42 around a sprocket 43 on shaft 40 and a sprocket 45 on a shaft 46 in the direction of arrow 44. Another chain 47 driven from a sprocket 48 on shaft 46 drives a sprocket 49 on a shaft 50 passing through bracket 11. Spiral gears 51 mounted on shaft 50 drive the gears 17 as mentioned previously.

In order to revolve the rolls 23 in the opposite direction from rolls 14, a pair of gears 52 and 53 on shafts 46 and 21 are provided, a chain 54 about sprocket 55 on shaft 21 and sprocket 56 on a shaft 57 moving thereby in direction shown by arrow 58 (Fig. 1). The movement of the shaft 57 transmitted through the spiral gears 59 revolves the rolls 23 as desired.

The clutch 41 is controlled by means of a yoke 60 on a vertical shaft 61, said shaft being fitted in a bearing 62 on standard 19 and in a bracket 63. A bevel gear 64 keyed to shaft 61 meshes with a bevel gear 65 on a shaft 66, said shaft being fitted with one end in the bracket 63 and the other end in a bearing 67 mounted on the floor. A treadle 68, keyed on shaft 66, is adapted to rotate the shaft 66, gears 64 and 65, and the shaft 61, thereby operating clutch 41.

In order to facilitate the guiding of the tire band between the beveled rolls, two rods 69 and 70 are mounted in front of the rolls 14 and 23 by means of brackets 71 and 72. The upper rod 70 is fitted with guiding rolls 73 adapted to have the bead edges of the band A press against them.

Figure 4:
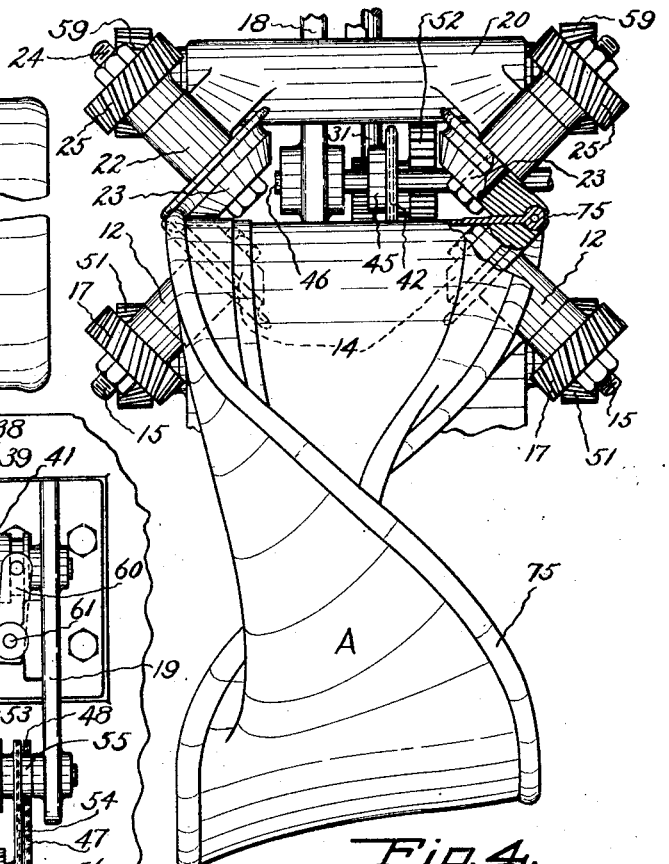
Fig. 4 is an enlarged view of the turning and stitching rolls shown in Fig. 2, showing a band between the rolls partially inverted.

Having thus described the apparatus, I will now explain the process of inverting a tire band. The machine operator grasps the tire beads and turns them inside out at one part of the band A. By stepping on the treadle 26 the toggle is raised thereby increasing the slight opening between the rolls 14 and 23 and allowing the insertion of the inverted part of the band A. Upon the operator's release of treadle 26, the weight 37 causes the toggle to close, bringing the rolls 23 tightly over the tire bead edges as shown in Fig. 4. The tire band A will then lie between the rods 69 and 70, between the rolls 14 and 23 and down around an opening 74 in the bedplate 13. The tire bead edges 75 of band A will press against the rolls 73, these rolls guiding the bead edges 75 straight through grooves 76 formed between the rolls 14 and 23. The movement of the rolls 14 and 23 gradually draws the tire band A between them, this inverting the band in its entirety.

In building a tire band with beaded edges, the fabric is not always pressed firmly about the tire beads thereby causing wrinkles that should be removed. While completing the inversion of the band A on my apparatus, the rolls 14 and 23 will also stitch the fabric 78 of the band A tightly about the bead wire 79, ironing out all the undesired wrinkles. As the band is not always of the desired width, the rolls 14 and 23 are set so that the bead retaining grooves 76 are at a predetermined distance apart, this, combined with the outward pull caused by the beveled surfaces of the rolls 14 and 23, stretching the band to the desired width.

Having thus described my invention, I claim:

1. A band inverting device for use in the manufacture of tire casings comprising a pair of beveled, rotatable rolls horizontally opposed to each other in a fixed position, a pivoted bracket having a pair of beveled, rotatable rolls meeting the said horizontally opposed rolls at their beveled surfaces, and means for raising the pivoted bracket away from the rolls in the fixed position.

2. A band turning and stretching device for use in the manufacture of tire casings comprising two pairs of beveled, rotatable rolls, one pair placed above the other and set at a predetermined distance apart, means for rotating the rolls in opposing directions, means for pressing one pair of the rolls firmly against a flat band carried by the other rolls, means for guiding the tire material straight into a groove formed by the acting surfaces of the two pairs of rolls, means for rotating the said rolls as desired, and means for raising the upper pair of rolls from contact with the lower rolls or the band for the insertion or removal of the said band.

3. A method of inverting bands having beaded edges in the manufacture of tire casings which comprises inverting a section of a tire band, gradually rotating the band along the beaded edges starting at the inverted section thereby inverting the band in its entirety, stretching the band to a predetermined width, and stitching the band material firmly about an enclosed bead wire.

THOMAS MIDGLEY.